(12) United States Patent
Hyslop

(10) Patent No.: US 7,527,305 B2
(45) Date of Patent: May 5, 2009

(54) HOSE CONNECTOR WITH ADJUSTABLE AMBIENT AIR INLETS

(76) Inventor: William J. Hyslop, 105 Jefferson Valley, Coatesville, IN (US) 46121

( * ) Notice: Subject to any disclaimer, the term of this patent is extended or adjusted under 35 U.S.C. 154(b) by 0 days.

(21) Appl. No.: 12/130,061

(22) Filed: May 30, 2008

(65) Prior Publication Data

US 2008/0296891 A1    Dec. 4, 2008

Related U.S. Application Data

(60) Provisional application No. 60/932,385, filed on May 31, 2007.

(51) Int. Cl.
*F16L 21/00*    (2006.01)

(52) U.S. Cl. .......................... 285/398; 285/7; 285/371; 285/924; 137/217

(58) Field of Classification Search .............. 285/7, 285/371, 398, 924; 137/217
See application file for complete search history.

(56) References Cited

U.S. PATENT DOCUMENTS

| | | | | | |
|---|---|---|---|---|---|
| 2,146,252 | A | * | 2/1939 | Ell .................................. | 285/7 |
| 2,150,765 | A | * | 3/1939 | Forsberg ......................... | 285/7 |
| 2,212,679 | A | * | 8/1940 | White ............................. | 285/7 |
| 2,523,770 | A | * | 9/1950 | Marette .......................... | 285/7 |
| 2,730,116 | A | * | 1/1956 | Rickard ...................... | 137/217 |
| 2,733,668 | A | | 2/1956 | Pfetzing .................. | 104/52 X |
| 2,793,057 | A | | 5/1957 | McGugin ..................... | 285/9.1 |
| 2,864,406 | A | | 12/1958 | Schewel ...................... | 239/505 |
| 2,951,714 | A | * | 9/1960 | Carlberg ......................... | 285/7 |
| 2,990,198 | A | | 6/1961 | Imming ...................... | 285/9.1 |
| 4,019,537 | A | | 4/1977 | Bonnard et al. ............... | 138/37 |
| 4,102,254 | A | | 7/1978 | Grant .......................... | 98/115 |
| 4,699,046 | A | | 10/1987 | Bellieni ..................... | 98/115.4 |
| 4,796,520 | A | | 1/1989 | Kramer ..................... | 98/15.4 |
| 4,906,032 | A | | 3/1990 | Hohman ..................... | 285/319 |
| 5,092,228 | A | | 3/1992 | Pfeiffer et al. ................ | 454/63 |
| 5,096,230 | A | | 3/1992 | Pausch et al. ................ | 285/9.1 |
| 5,162,017 | A | | 11/1992 | Nordin ........................ | 454/63 |
| 5,330,234 | A | | 7/1994 | Sweeny ........................ | 285/62 |
| 5,362,273 | A | | 11/1994 | Pfeiffer et al. ................ | 454/63 |
| 5,466,900 | A | | 11/1995 | Knapp ......................... | 285/62 |
| 5,609,298 | A | | 3/1997 | Hyslop ....................... | 239/289 |
| 5,927,759 | A | | 7/1999 | Hyslop ....................... | 285/9.1 |
| 7,104,881 | B1 | | 9/2006 | Hyslop ........................ | 454/63 |
| 2005/0045419 | A1 | | 3/2005 | Choi et al. ................... | 181/270 |

FOREIGN PATENT DOCUMENTS

CA    1256813    4/1989    .............. 239/289

OTHER PUBLICATIONS

Advertising brochure of Tykron Products, Roberts-Gordon, Inc., P. O. Box 44, Buffalo, NY 14240-0044; 241 So. Service Road West, Grimsby, Ontario, Canada L3M1Y7, Oct. 1995; 4 pgs.

* cited by examiner

*Primary Examiner*—Aaron M Dunwoody
*Assistant Examiner*—Fannie Kee
(74) *Attorney, Agent, or Firm*—Woodard, Emhardt, Moriarty, McNett & Henry LLP

(57) ABSTRACT

A hose connector with adjustable ambient air inlets includes a conduit section having a plurality of spaced-apart holes covered by an adjustable outer ring having a similar pattern of spaced-apart holes. Turning the outer ring relative to the conduit section permits the holes in the conduit section to be either fully opened, fully covered, or at some intermediate condition.

16 Claims, 2 Drawing Sheets

HOSE CONNECTOR WITH ADJUSTABLE AMBIENT AIR INLETS

CROSS REFERENCES TO RELATED APPLICATIONS

The present application claims the benefit of U.S. Provisional Patent Application Ser. No. 60/932,385, filed May 31, 2007, entitled "HOSE CONNECTOR WITH ADJUSTABLE AMBIENT AIR INLETS" which is hereby incorporated by reference in its entirety.

BACKGROUND OF THE INVENTION

As EPA regulations for diesel engines continue to require cleaner running engines, it is anticipated that these engines will need to run hotter. One technique to try and reduce the amount of particulate in the diesel engine exhaust is to increase the heat of combustion, and this is why it is anticipated that the engines will run hotter.

Fire response vehicles, such as fire trucks, typically have diesel engines and one further characteristic. Since these vehicles are housed inside a fire station or similar structural enclosure and are started while still within the fire station, an exhaust hose is used to route the vehicle exhaust to the outside. A large exhaust blower is used so as to pull the exhaust from each vehicle and direct it to the outside via the exhaust hose and duct work While the sizes and materials that are suitable and used for such exhaust hoses may vary, the most common materials are generally rated for withstanding a continuous operating temperature (exhaust temperature) of approximately 500° F. However, if these types of diesel engines are going to run hotter in order to satisfy the EPA requirements, it is anticipated that this 500° F. rating may be exceeded, and thus there is an obvious problem in terms of the suitability as well as the life expectancy for these exhaust hoses.

One approach for solving this problem of premature exhaust hose replacement is to introduce ambient air into the exhaust stream so as to reduce the temperature of the exhaust stream. The structure for doing so, according to the present disclosure, is a hose connector with an adjustable ambient air inlet feature. By positioning this hose connector between two sections of the exhaust hose or between the nozzle elbow and exhaust hose, ambient air is able to be introduced into the exiting exhaust stream, thereby lowering the temperature of the exiting exhaust and accordingly lower the temperature that is sensed or experienced by portions of the exhaust hose.

BRIEF SUMMARY

A hose connector with adjustable ambient air inlets according to the present disclosure includes a conduit section having a plurality of spaced-apart holes covered by a moveably adjustable outer ring having a similar pattern of spaced-apart holes. Turning the outer ring relative to the conduit section, permits the holes in the conduit section to be either fully opened, fully covered, or at some intermediate condition.

DETAILED DESCRIPTION

Figure 1:
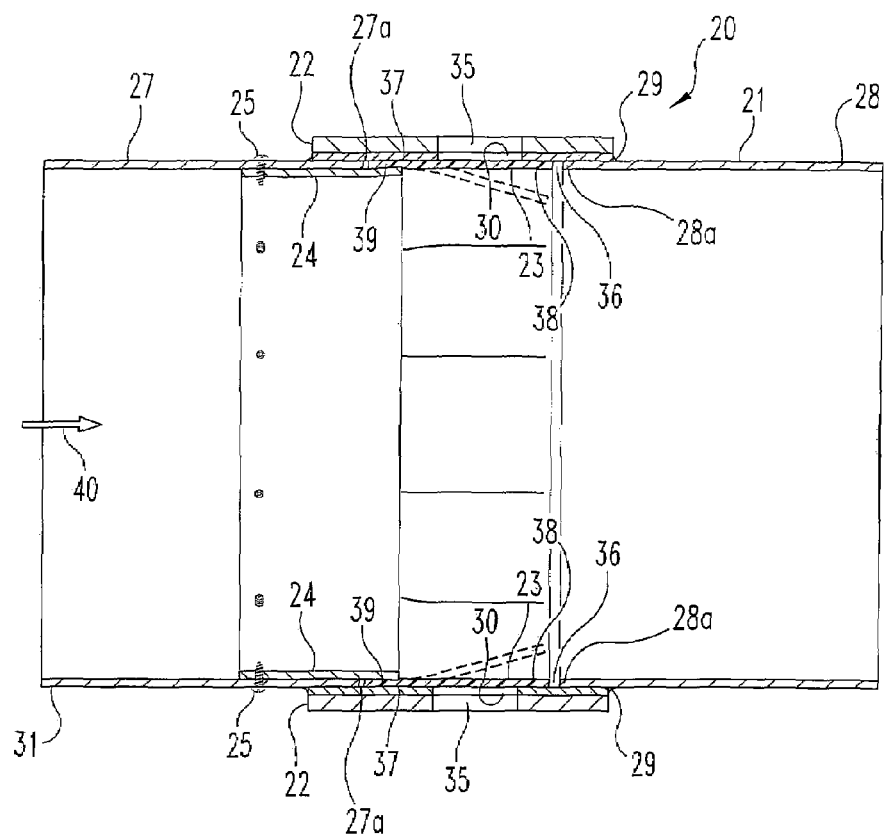
FIG. 1 is a side elevational view, in full section, of a hose connector according to a typical embodiment of the present invention.

For the purposes of promoting an understanding of the disclosure, reference will now be made to the embodiments illustrated in the drawings and specific language will be used to describe the same. It will nevertheless be understood that no limitation of the scope of the disclosure is thereby intended, such alterations and further modifications in the illustrated device and its use, and such further applications of the principles of the disclosure as illustrated therein being contemplated as would normally occur to one skilled in the art to which the disclosure relates.

Figure 2:
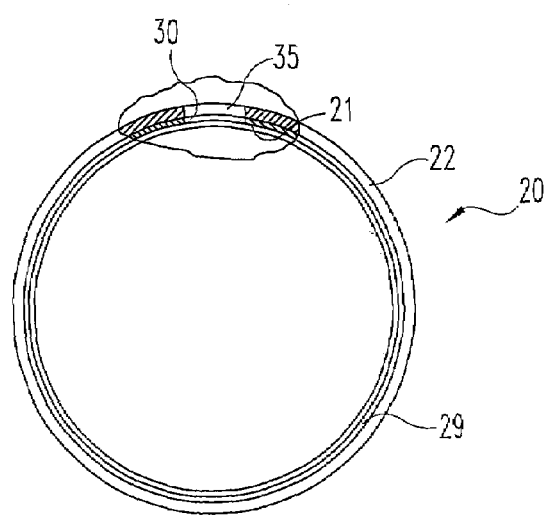
FIG. 2 is a fragmentary, end elevational view of the FIG. 1 hose connector.

Referring to FIGS. 1 and 2, there is illustrated a hose connector 20 according to the present disclosure. Hose connector 20 includes a conduit body 21, an outer slip ring 22, an inner rubber sleeve 23, and an interior clamp 24 that is bent slightly at one end so as to apply pressure to sleeve 23. Clamp 24 is secured in position and attached to body 21 using metal screws 25.

Conduit body 21 is an annular, stainless steel or optionally an aluminum member having two generally cylindrical end sections 27 and 28 that are connected together by an external, generally cylindrical sleeve section 29 that is tack welded in place. The combination of end sections 27 and 28 and sleeve section 29 is configured as an integral unit. End section 27 includes a facing end 27a. End section 28 includes a facing end 28a. Section 29 spans across the facing ends 27a and 28a and is generally concentric with end sections 27 and 28. The outside diameter of each end section 27 and 28 is approximately 5.0 inches. The outside diameter of section 29 is slightly larger than 5.0 inches. Section 29 defines a series of equally-spaced holes 30, each hole measuring approximately ½ inch in diameter. In the preferred embodiment, there are sixteen (16) holes, but the number of holes and the diameter of each hole can vary depending on the amount of ambient air to be introduced, the degree of adjustability desired, and the specific design constraints.

The overall length of conduit body 21 measures approximately 8.0 inches with section 29 measuring approximately 2.25 inches in length and being located 2¾ inches in from end 31. Slip ring 22 also measures approximately 2.25 inches in length and is positioned so as to fit precisely over and around section 29. Slip ring 22 fits closely around section 29 and defines a plurality of equally-spaced holes 35 that are the same in number and substantially equal in size and spacing to holes 30. Since slip ring 22 is able to be turned (i.e., rotated) relative to section 29 (i.e., moveable), it will be understood that these two sets of holes 30 and 35 can be placed in complete or total alignment (fully opened), or in complete non-alignment (fully closed), or in any partial alignment condition between these two extremes.

Rubber sleeve 23 is fabricated from a high-temperature silicone rubber and has an axial length that is just slightly shorter than relief area 36 defined by section 29 in combination with the spacing between ends 27a and 28a. One end of sleeve 23 is tightly clamped against wall 37 of section 29 by the use of clamp 24. This allows the opposite (free) end or edge 38 to deflect in a radially inward direction, as depicted by the broken line position of edge 38 in FIG. 1. One end of clamp 24 is securely attached to body 21. The opposite end of clamp 24 overlaps one end 39 of sleeve 23 and is used to tightly clamp end 39 of sleeve 23 against inner wall 37.

Rubber sleeve 23 is positioned relative to section 29 so as to lay over and completely cover each hole 30. In order for ambient air to enter conduit body 21, the free end or edge 38 must deflect inwardly so as to uncover holes 30. This assumes that at least some portion of each hole 35 overlaps some portion of its corresponding hole 30 so that an air flow path is established from the outside (ambient air) to the interior of conduit body 21. Rubber sleeve 23 may be slit at a series of spaced-apart locations between the holes 30. This makes it easier for each segmented flap that is created between slits to defect due to negative pressure so as to uncover its corresponding and aligned hole 30. The direction of the exhaust flow is represented by arrow 40.

Figure 3:
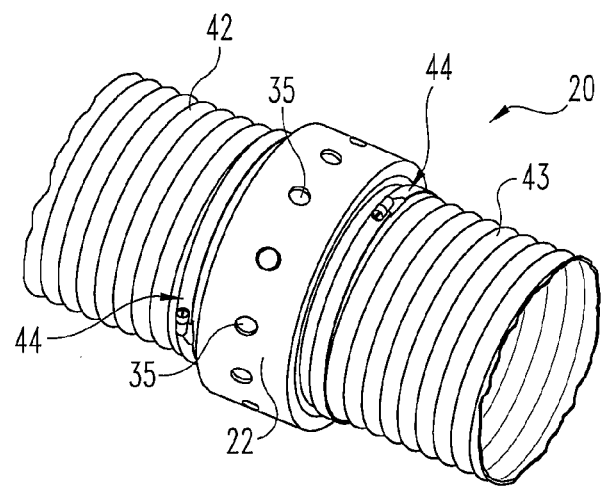
FIG. 3 is a partial, perspective view of the FIG. 1 hose connector assembled into an exhaust hose for a diesel engine, between two sections of that exhaust hose.

Referring now to FIG. 3, in order to integrate hose connector 20 into a vehicle exhaust hose, the exhaust hose is configured in two sections 42 and 43. One hose section 42 fits over section 27 and is tightly clamped to and around section 27 with band clamp 44. The other hose section 43 fits over section 28 and is tightly clamped to and around section 28 with another band clamp 44. The opposite end of section 42 is connected to a nozzle 54, which is then connected to the tail pipe or exhaust pipe of the vehicle. The opposite end of hose section 43 is connected to an exhaust blower duct system, see FIG. 4. A variety of covering sleeves, sealant compounds, and similar techniques are contemplated for creating a tightly sealed and strong connection of the conduit body 21 to and within the two exhaust hose sections 42 and 43.

In use, when the vehicle is started and exhaust is generated, the exhaust begins to flow through the first exhaust hose section 42 due to its connection to the vehicle. This particular approach, including the connection of hose section 42 to the vehicle, is believed to be well known. When the exhaust from the vehicle activates an exhaust duct pressure switch, the exhaust blower 50 is turned on. Between the initial vehicle start up and the activation of the exhaust blower 50, there will be a positive pressure for a brief period of time. This positive pressure within conduit 21 pushes the sleeve 23 against the holes 30 so that the diesel exhaust does not escape through holes 30 and 35 before the blower starts and creates a negative pressure within the hose.

When the exhaust blower 50 comes on, a negative pressure (suction) is created in the exhaust hose sections 42, 43, and in the conduit body 21. This negative pressure causes the free edge 38 of sleeve 23 to deflect radially inwardly so as to uncover at least a portion of each of the holes 30 and allow ambient air to flow into the exiting exhaust stream. This of course assumes that some portion, if not all, of the open area of holes 35 are aligned with all or at least a portion of holes 30. The entry of ambient air into the existing exhaust stream lowers the temperature of the exhaust stream. Lowering of the exhaust temperature is expected to prolong the life of the exhaust hose/hose sections.

Figure 4:
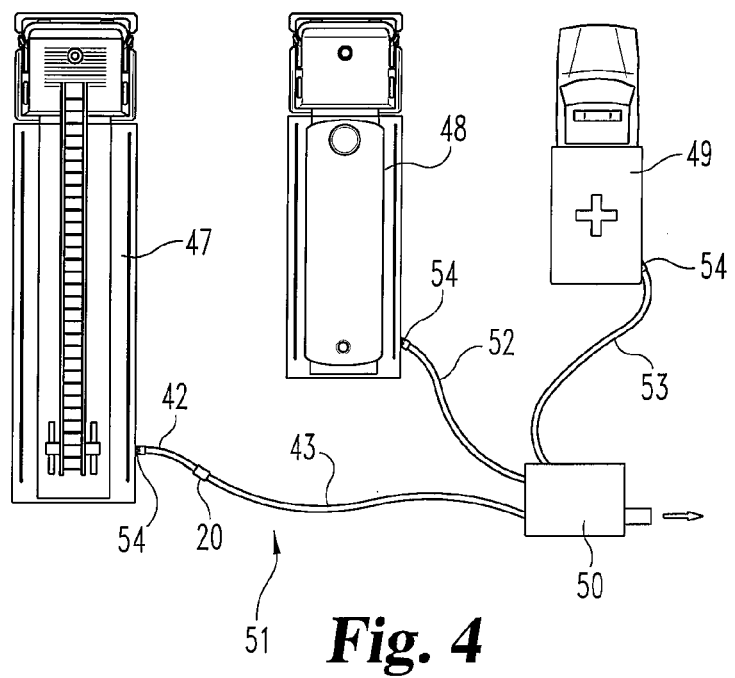
FIG. 4 is a diagrammatic illustration of a plurality of diesel-engine vehicles that are commonly connected to the same exhaust blower.

With further reference to the diagrammatic illustration of FIG. 4, the three vehicles 47, 48, and 49 each represent a vehicle with a diesel engine, preferably a fire truck. The exhaust conduit of each vehicle 47, 48, and 49 is connected in parallel to the common exhaust blower 50 by way of exhaust hoses 51, 52, and 53, respectively. Only vehicle 47 is equipped with hose connector 20. When the exhaust blower turns on and establishes suction, as previously described, the free end 38 of the rubber sleeve 23 deflects, opening holes 30 for the in-flow of ambient air, assuming that at least a portion of holes 35 are aligned with at least a portion of holes 30 so as to establish an air flow path from the outside to the interior of the conduit body 21. Vehicle 47 is illustrated in combination with hose connector 20 and hose sections 42 and 43. The shorter hose section 42 measures approximately 6.0 feet in length or less and may have a 1200° F. temperature rating. The connector 20 is used to connect the 1200° F. hose to the 500° F. hose and is used for adding ambient air to the exhaust stream at that point to prevent damage to the 500° F. hose. The connector 20 could be connected at the nozzle elbow and protect a less expensive hose with a 1000° F. rating. Vehicles 48 and 49 are not equipped with the hose connector 20 simply for purposes of explaining what occurs when the exhaust blower 50 turns on and one of the connected vehicles is not running.

As vehicle 47 is started and generates exhaust, the exhaust blower 50 is turned on and draws a negative pressure (i.e., suction) on vehicle 47 as well as on vehicles 48 and 49. Since vehicles 48 and 49 are not running, in this example, the suction created by exhaust blower 50 causes an air flow path of some type to be established in an effort to offset the negative pressure being created by the exhaust blower. It should be understood that the exhaust hoses 52 and 53 still connect the corresponding vehicles to the exhaust blower 50 and those exhaust hoses are tightly connected and sealed around the exhaust (tail) pipe of the vehicle. As such, there is no air inlet into either exhaust hose exterior of the vehicle.

It has been discovered that negative pressure of this type applied to an exhaust hose can cause the vehicle turbocharger to experience a reverse spin. As noted, this reverse spin of the turbocharger occurs when the vehicle's diesel engine is not running. This in turn means that the main bearings of the turbocharger are not being lubricated. In time, this can result in premature turbocharger failure.

From this explanation, it will be appreciated that the disclosed structure offers at least two improvements. One improvement is the introduction of ambient air into the exhaust hose so as to lower the temperature of the diesel engine exhaust, thereby increasing the life of the exhaust hose. The second improvement is to reduce or eliminate turbocharger spinning, thereby increasing or prolonging the life of the turbocharger.

While the preferred embodiment of the invention has been illustrated and described in the drawings and foregoing description, the same is to be considered as illustrative and not restrictive in character, it being understood that all changes and modifications that come within the spirit of the invention are desired to be protected.

The invention claimed is:

1. A hose connector for use with a vehicle exhaust hose comprising:
 a first conduit;
 a second conduit;
 a sleeve section connected to said first conduit and said second conduit and being constructed and arranged to span a space between said first conduit and said second conduit, said sleeve section defining a sidewall opening;
 an outer slip ring positioned around said sleeve section, said outer slip ring being rotatable relative to said sleeve section and defining a sidewall opening;
 an inner sleeve attached to one of said first conduit and said second conduit and including a moveable end extending across the sidewall opening of said sleeve section; and
 wherein when the sidewall opening of said outer slip ring overlaps a portion of the sidewall opening of said sleeve section, and when said moveable end moves off of said sidewall opening of said sleeve section, ambient air is allowed to flow through said sidewall openings.

2. The hose connector of claim 1 wherein said sleeve section defines a spaced-part plurality of sidewall openings.

3. The hose connector of claim 2 wherein said outer slip ring defines a spaced-apart plurality of sidewall openings.

4. The hose connector of claim 3 wherein the plurality of sidewall openings in said sleeve section and the plurality of sidewall openings in said outer slip ring are of the same number and spacing.

5. The hose connector of claim 4 wherein said inner sleeve is fabricated from high-temperature silicone rubber.

6. The hose connector of claim 5 wherein said inner sleeve is constructed and arranged with individual segmented flaps created by slits.

7. The hose connector of claim 1 wherein said inner sleeve is fabricated from high-temperature silicone rubber.

8. The hose connector of claim 7 wherein said inner sleeve is constructed and arranged with individual segmented flaps created by slits.

9. In combination:
   a first exhaust hose section;
   a second exhaust hose section; and
   a hose connector comprising:
      a first conduit;
      a second conduit;
      a sleeve section connected to said first conduit and said second conduit and being constructed and arranged to span a space between said first conduit and said second conduit, said sleeve section defining a sidewall opening;
      an outer slip ring positioned around said sleeve section, said outer slip ring being rotatable relative to said sleeve section and defining a sidewall opening;
      an inner sleeve attached to one of said first conduit and said second conduit and including a moveable end extending across the sidewall opening of said sleeve section; and
   wherein when the sidewall opening of said outer slip ring overlaps a portion of the sidewall opening of said sleeve section, and when said moveable end moves off of said sidewall opening of said sleeve section, ambient air is allowed to flow through said sidewall openings; and
   wherein a first end of said hose connector is connected to said first exhaust hose section and a second end of said hose connector is connected to said second exhaust hose section.

10. The combination of claim 9 wherein said sleeve section defines a spaced-part plurality of sidewall openings.

11. The combination of claim 10 wherein said outer slip ring defines a spaced-apart plurality of sidewall openings.

12. The combination of claim 11 wherein the plurality of sidewall openings in said sleeve section and the plurality of sidewall openings in said outer slip ring are of the same number and spacing.

13. The combination of claim 12 wherein said inner sleeve is fabricated from high-temperature silicone rubber.

14. The combination of claim 13 wherein said inner sleeve is constructed and arranged with individual segmented flaps created by slits.

15. The combination of claim 9 wherein said inner sleeve is fabricated from high-temperature silicone rubber.

16. The combination of claim 15 wherein said inner sleeve is constructed and arranged with individual segmented flaps created by slits.

* * * * *